May 21, 1963　　J. A. HESKETH ETAL　　3,090,634
BABY CARRIAGE CONVERTIBLE TO CRADLE

Filed Jan. 29, 1960　　4 Sheets-Sheet 1

INVENTORS.
JAMES ALAN HESKETH
HERBERT RUBIN
BY
James and Franklin
ATTORNEYS

May 21, 1963 J. A. HESKETH ETAL 3,090,634
BABY CARRIAGE CONVERTIBLE TO CRADLE
Filed Jan. 29, 1960 4 Sheets-Sheet 2
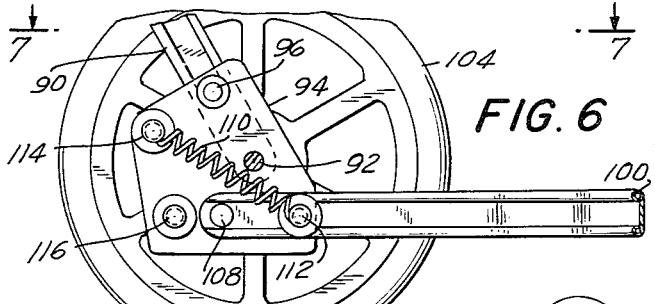
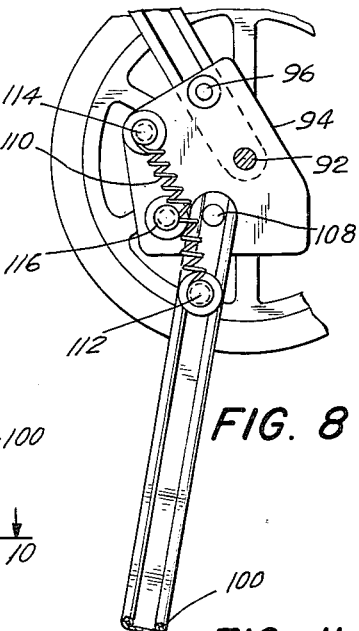
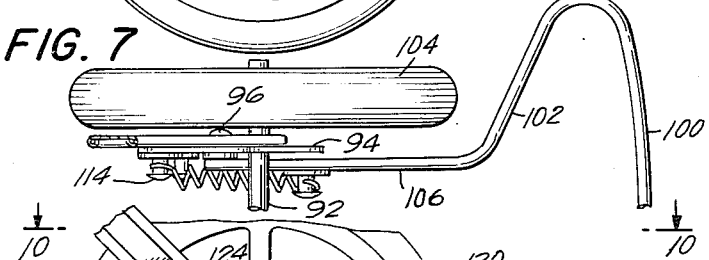
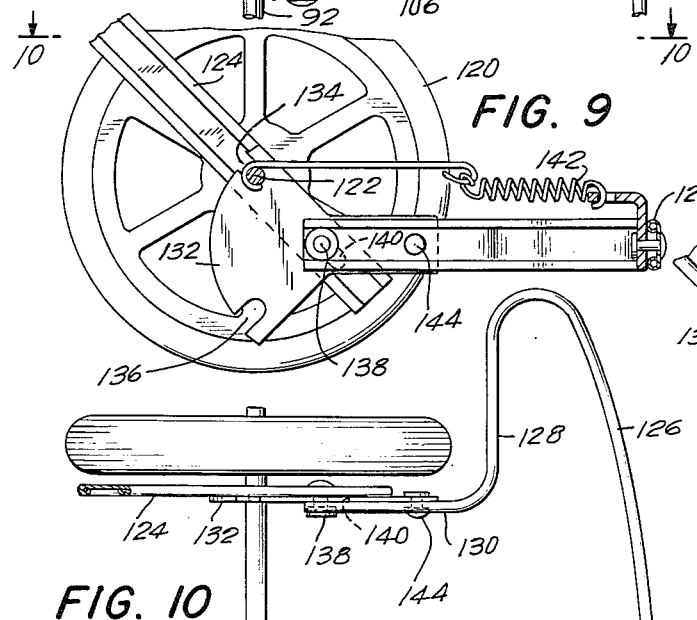
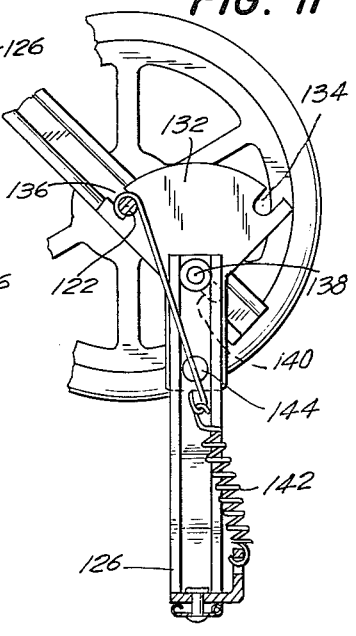
INVENTORS.
JAMES ALAN HESKETH
HERBERT RUBIN
BY
*James and Franklin*
ATTORNEYS May 21, 1963   J. A. HESKETH ETAL   3,090,634
BABY CARRIAGE CONVERTIBLE TO CRADLE
Filed Jan. 29, 1960   4 Sheets-Sheet 3

INVENTORS.
JAMES ALAN HESKETH
HERBERT RUBIN
BY
James and Franklin
ATTORNEYS

May 21, 1963 J. A. HESKETH ETAL 3,090,634
BABY CARRIAGE CONVERTIBLE TO CRADLE
Filed Jan. 29, 1960 4 Sheets-Sheet 4
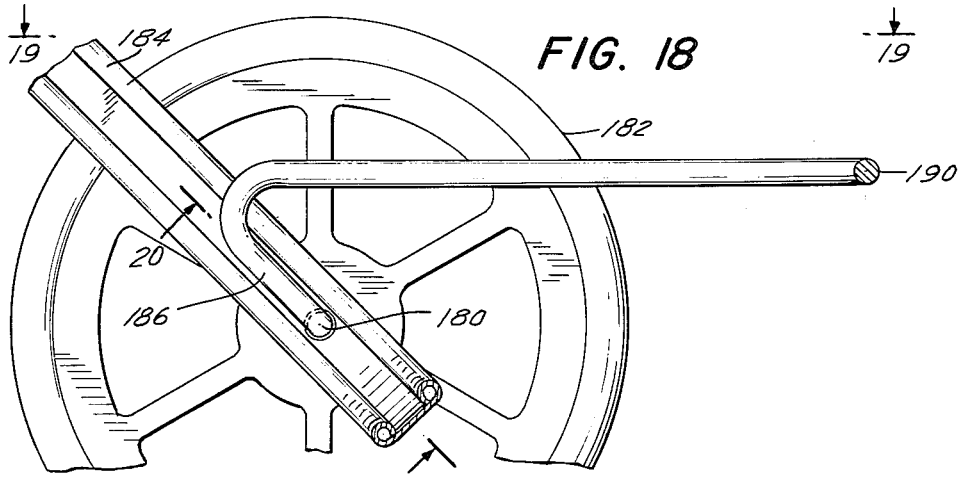
FIG. 18
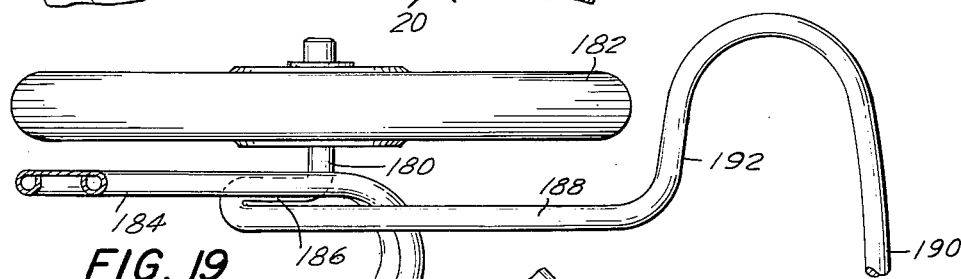
FIG. 19
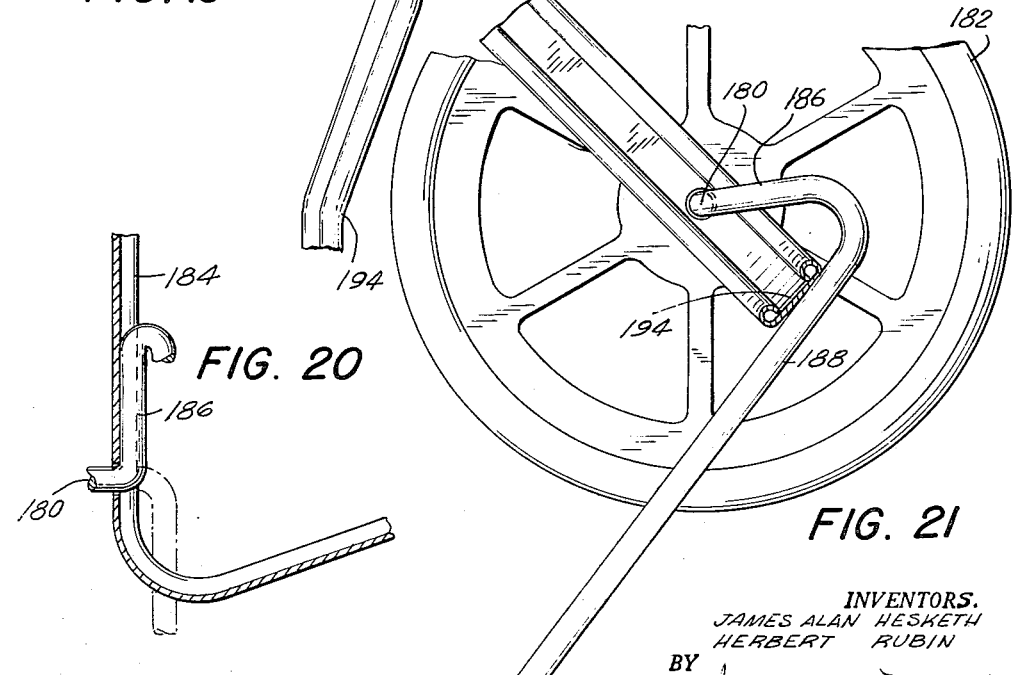
FIG. 20
FIG. 21
INVENTORS.
JAMES ALAN HESKETH
HERBERT RUBIN
BY
James and Franklin
ATTORNEYS

United States Patent Office 3,090,634
Patented May 21, 1963

3,090,634
BABY CARRIAGE CONVERTIBLE TO CRADLE
James Alan Hesketh, Lawrence, Mass., and Herbert Rubin, New York, N.Y.; said Hesketh assignor to said Rubin
Filed Jan. 29, 1960, Ser. No. 5,475
3 Claims. (Cl. 280—31)

This invention relates to baby carriages, and more particularly to baby carriages of reduced size used by children for dolls. Features of the invention are applicable to both full size and miniature baby carriages, and the term "baby carriage" is used for convenience, but the carriages illustrated and described are all small carriages used by children for dolls.

Carriages are frequently made with a folding frame and a soft or collapsible body, so that the whole carriage may be folded to small dimension. One object of the present invention is to provide such a folding carriage with rockers which may be raised out of the way, or which may be lowered to a point below the wheels so that the carriage then may be rocked like a cradle.

Another object of the invention is to further utilize the rockers when not used as rockers. For this purpose, the rockers are raised outwardly, and are so shaped and dimensioned that they are used as effective bumpers for the carriage. They are provided with detent means to hold them in desired position.

Another object is to provide a brake for holding the carriage against rolling. For this purpose one rocker or the other is lowered.

A still further object is to provide rockers and detent means which do not interfere with easy folding of the carriage.

To accomplish the foregoing general objects and other more specific objects which will hereinafter appear, the invention resides in the baby carriage, rocker-and-bumper elements, and their relation one to another, as are hereinafter more particularly described in the following specification. The specification is accompanied by drawings in which:

FIGURE 6 is a vertical section inside the frame, much as in FIGURE 2, but showing a modified form of the invention;

FIGURE 7 is a fragmentary section taken approximately in the plane of 7—7 of FIGURE 6;

FIGURE 8 is a vertical section similar to FIGURE 6, but showing the rocker in lowered position;

FIGURE 9 is a fragmentary vertical section, much as in FIGURE 6, showing another form of the invention, and taken approximately in the plane of the line 9—9 of FIGURE 10;

FIGURE 10 is a fragmentary horizontal view looking in the direction of the arrows 10—10 of FIGURE 9;

FIGURE 11 is a view similar to FIGURE 9, but showing the rocker in lowered position;

FIGURE 18 is a fragmentary vertical section, similar to FIGURES 6, 9 and 15, but showing still another form of the invention in which the axles are formed at the ends of the rocker;

FIGURE 19 is a horizontal section taken approximately in the plane of line 19—19 of FIGURE 18;

FIGURE 20 is a fragmentary section taken in the plane of the line 20—20 of FIGURE 18; and FIGURE 21 is a view similar to FIGURE 18, but showing the rocker in lowered position.

Figure 1:
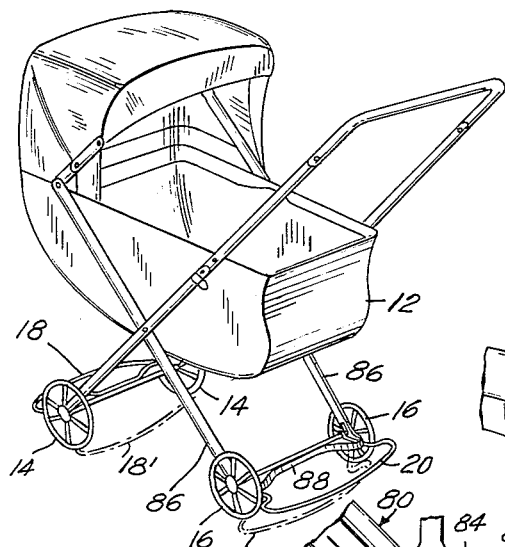
FIGURE 1 is a perspective view showing a foldable baby carriage (doll carriage) embodying features of the invention.

Referring to the drawings, and more particularly to FIGURE 1, the baby carriage comprises a body 12, wheels 14 and 16, a rocker 18 extending transversely of the carriage at one end, and another rocker 20 extending transversely of the carriage at the other end. The rockers 18 and 20 are pivotally mounted for movement between a raised position shown in solid lines, and a lowered position shown in broken lines at 18′ and 20′. The rockers in their raised position are adapted to act as bumpers for the carriage, and for this purpose they preferably project beyond the ends of the body.

Figure 12:
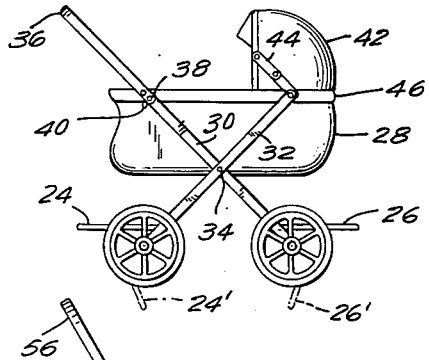
FIGURE 12 is a side elevation of a doll carriage, with the rockers raised to act as bumpers.

This is better shown in FIGURE 12 of the drawing in which rockers are shown at 24 and 26. They are pivoted for movement down to lowered position 24′, 26′, at which time they come beneath the wheels, and thus afford a rocking or cradle action. When the rockers are turned upward to the horizontal or raised position shown in solid lines, they act as bumpers, and for this purpose they preferably project beyond the ends of the body 28.

In the particular form of carriage here shown, the frame is made of crossed members 30 and 32 pivoted at 34. The U-shaped handle 36 is pivoted on frame members 30 at 38, and a latch or releasable detent is provided at 40. The hood 42 is held up by spreaders 44, and these are jointed to permit folding down of the hood. The body 28 is made of a flexible material, typically fabric or sheet plastic, it being held in shape by a generally rectangular peripheral frame 46, from which the soft body hangs.

Figure 13:
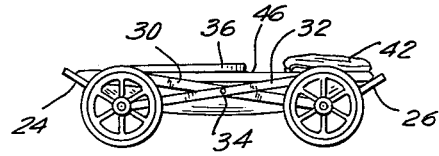
FIGURE 13 shows how the carriage of FIGURE 12 folds without interference by the rocker mechanism.

Apart from the rockers the construction is a known one, and the carriage may be folded or collapsed as shown in FIGURE 13, in which the frame members 30 and 32 have been turned down; part 46 has moved down to the crossed members; the handle 36 has been turned inward, and the hood 42 has been folded down. The rockers 24, 26 are preferably left in their raised or bumper position, and the folded carriage is substantially as compact as it was before the addition of the rockers.

Figure 14:
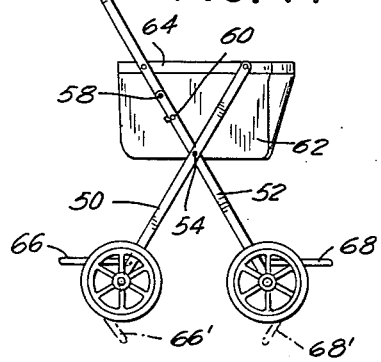
FIGURE 14 is a side elevation showing how the invention may be applied to a carriage of the type in which a baby or doll is seated, commonly called a "stroller"

FIGURE 14 shows how the invention may be applied to a stroller, and the similarity between FIGURES 14 and 12 will be apparent, there being crossed frame members 50 and 52 pivoted at 54, with a handle 56 joined at 58 and secured or latched at 60 to the frame 52. The soft body 62 is suspended from a generally rectangular frame 64. It will be understood that the forward end of body 62 has leg openings so that the legs of the doll (or baby) hang down from the body.

Here again, there are rockers shown in raised position in solid lines at 66 and 68, and shown in lowered position in broken lines at 66′ and 68′.

To fold the carriage the detent is released at 60 and the handle 56 is folded forward at which time the handle and the crossed frame members 50 and 52 settle down with the frame 64, much as shown in FIGURE 13.

It will thus be seen that in all cases the rockers are optionally usable, and when not in use are turned up to act as bumpers for the carriage. The pivotal mounting and detent means for the rockers are so localized at the wheels and axles as not to interfere with the desired folding action of the carriage.

Figure 3:
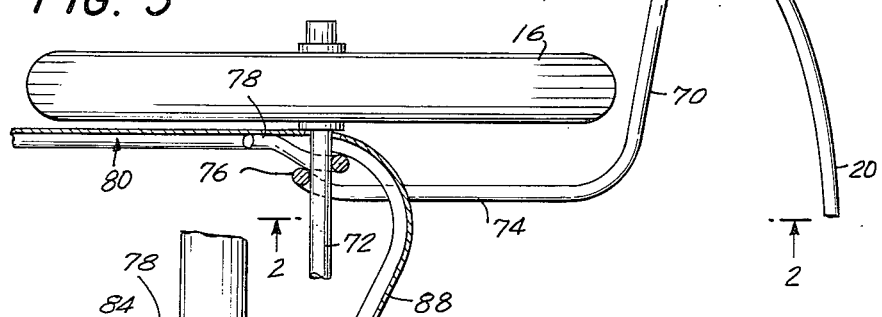
FIGURE 3 is a generally horizontal section taken approximately in the plane of the line 3—3 of FIGURE 2.
Figure 5:
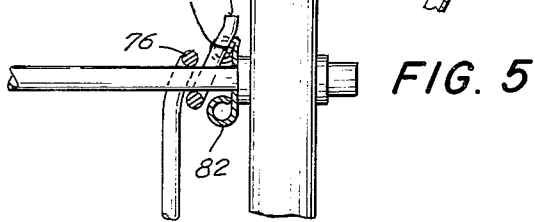
FIGURE 5 is a fragmentary section taken approximately in the plane of the line 5—5 of FIGURE 4.

The invention is illustrated in a number of different forms. One form is that shown in FIGURES 1 through 5 of the drawing, in which the rocker 20 is made of a single piece of round steel rod. (Similar description applies to rocker 18.) The mid-portion is curved on a large radius to act as a rocker. The end portions are reversely bent as shown at 70 (FIG. 3) to come inside the wheels 16, and are then bent toward the axle 72 as shown at 74. They are then coiled about the axle at 76, so that the axle acts as a pivot for the rocker. At least one and preferably both end portions then project beyond the axle to serve further as a detent means 78.

The frame part 80 of the carriage is somewhat channel shaped, it being made of sheet metal which is rolled over at its edges to stiffen the same. The flat part of the channel is on the outside, while the rolled over edges or beads are on the inside, as shown at 82. The parts are so disposed that when the rocker is in its raised or generally horizontal position, the finger or extension 78 is received in the channel (FIG. 2) between the edge beads. The rocker is thus held resiliently in its raised or bumper position. This detent action is preferably provided at both ends of each rocker, but may be limited to one end.

Figure 4:
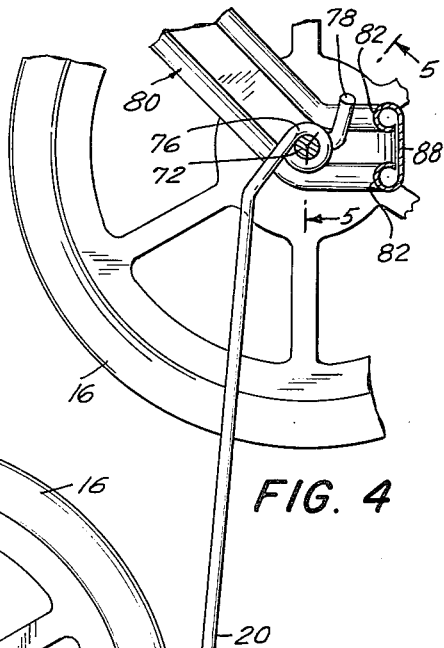
FIGURE 4 is a section similar to FIGURE 2, but showing the rocker in lowered position.
Figure 2:
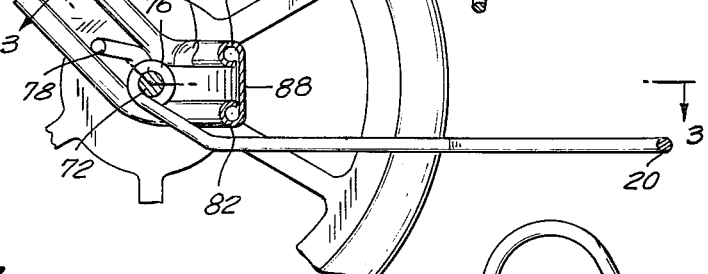
FIGURE 2 is a fragmentary vertical section taken approximately in the plane of the line 2—2 of FIGURE 3.

To change from raised to lowered position, the part 20 is pushed down until it moves to the generally upright position shown in FIGURE 4. At this time the detent extension 78 snaps into a detent recess shown at 84 in FIGURES 2 and 5. This recess is preferably provided by indenting or flattening the bead 82 at the desired location.

It will be understood that the rocker is so dimensioned that the initial horizontal spacing between the detents 78 at the ends of the rocker is greater than the distance when assembled or squeezed inside the frame. The extensions or detent fingers 78 then exert an outward pressure, and the rocker itself acts as a spring for the detents.

In the frame construction here shown, each half of the frame is generally U-shaped, that is, the sides 86 are joined at their lower ends by a cross connection 88, the parts 86 and 88 all being made of a single length of material. In such case the rocker is suitably shaped relative to the frame member to afford the desired approximately 90° swing of the rocker between its generally horizontal and generally upright positions.

Another form of my invention may be described with reference to FIGURES 6, 7 and 8 of the drawing. In this arrangement the sloping frame member 90 carries an axle 92, and additionally carries a plate 94 which may be secured in position by means of a rivet 96. The rocker 100 is formed out of channel material with rolled edges, the same as is used for the folding frame. However, flat resilient metal may be used advantageously. The rocker 100 is reversely bent at 102 (FIG. 7) to come inside the wheels 104 and is then turned toward the axle 92 as shown at 106. It is pivoted on plate 94 at 108, and is provided with an over-the-center spring 110. The spring is connected to the rocker at 112, and is connected to plate 94 at 114.

It will be evident that the spring is centered when the rocker has been turned part way between the bumper position shown in FIGURE 7 and the rocker position shown in FIGURE 8. The spring, therefore, serves to hold the rocker in raised position when the rocker has been raised, and to hold it in lowered position when it has been lowered. The motion is limited in the latter position by a suitable stop 116. The motion is limited in the raised position by the axle 92, against which the spring bears as shown in FIGURE 6. However, an additional fixed stop may be provided if desired. It will be understood that similar over-the-center springs may be and preferably are provided at both ends of both rockers.

Still another form of the invention is illustrated in FIGURES 9, 10 and 11 of the drawing. In this arrangement, wheel 120 and axle 122 are carried by sloping frame member 124, as in the examples previously described. The rocker 126 is formed out of channel shaped material with rolled edges, similar to that used for the frame. Here again flat resilient metal may be used. The rocker is reversely bent at its ends as shown at 128 (FIG. 10), and is then bent toward axle 122 as shown at 130. The ends of the rocker are each fixedly secured to a sector shaped plate 132. This has peripherally spaced notches 134 and 136.

The rocker 126 is pivotally mounted on frame member 124 by means of a pivot 138. This is received in a slot 140 in the frame member. A pull spring 142 urges the notched plate 132 into engagement with a stationary element. In the present case, the axle 122 is itself used as the stationary element, and receive either the notch 134 or the notch 136.

The sector shaped plate 132 has an extension which is secured to the rocker by means of a rivet 144, so that the plate turns with the rocker. It will be understood that to change the rocker from the raised position shown in FIGURE 9 to the lowered position shown in FIGURE 11, it is merely necessary to pull the rocker outward to disengage notch 134 from axle 122, and to then turn the rocker downward until the axle has been received in the other notch 136 as shown in FIGURE 11.

It will be understood that two small springs may be used, one at each end of the rocker, instead of a single spring in the middle, as here shown. It will also be understood that the spring as here shown acts also as an over-the-center spring, although that it is not essential. Notched plates may be used at both ends of the rocker, or at one end only.

Figure 15:
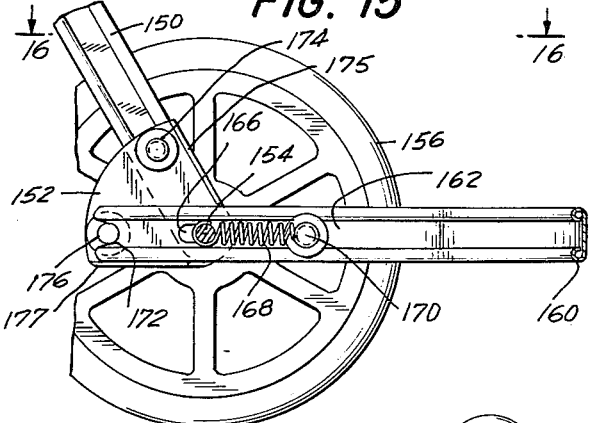
FIGURE 15 is a fragmentary vertical section, much as in FIGURES 7 and 9, but showing still another modification.
Figure 17:
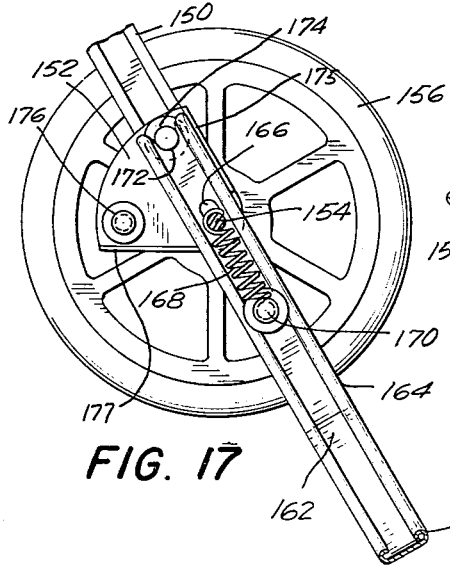
FIGURE 17 is a view similar to FIGURE 15, but showing the rocker in lowered position.
Figure 16:
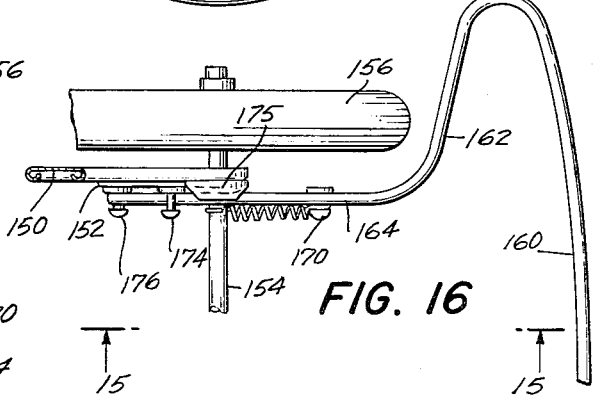
FIGURE 16 is a fragmentary horizontal section taken approximately in the plane of the line 16—16 of FIGURE 15.

Still another form of the invention is shown in FIGURES 15, 16 and 17 of the drawing. In this case the sloping frame member 150 carries a sector shaped plate 152 fixedly mounted thereon. It also carries the axle 154 and wheels 156. The rocker 160 again is shown made of channel shaped metal with rolled edges, but flat metal may be used and would have the advantage of greater resilience. The rocker is reversely bent at its ends as shown at 162 (FIG. 16), and is turned toward and beyond the axle as shown at 164. It is pivoted on the axle, and its bearing hole is a slot 166. The rocker is normally pulled toward the axle by means of pull springs 168. The outer ends of the springs are secured at 170 and the inner ends are hooked on the axle.

The free ends of the rocker are notched at 172. This engages either of two stationary pins shown at 174 and 176. The rocker is held in the raised position shown in FIGURE 15 when notch 172 engages pin 176, and it is held in the lowered position shown in FIGURE 17 when notch 172 engages pin 174. To change the rocker from one position to the other, it is pulled outward against the springs to disengage the notch, and is then swung to the other desired position. Its motion may be limited by stop flanges 175 and 177 bent inward at the edges of the plate 152.

Still another form of my invention is illustrated in FIGURES 18 through 21. In this form the axle and its associated rocker are made of a single piece of round rod. The carriages shown in FIGURES 12, 13 and 14 have this form of rocker.

Referring to FIGURE 19, the axle 180 is a short or stub axle which carries a single wheel 182. The axle passes through a mating hole in sloping frame member 184. It is then bent sideways as shown at 186 (FIG. 19), and then outward or nearly reversely as shown at 188. The mid-portion of the rocker is curved on a large radius as shown at 190, and the ends are bent reversely as shown at 192 to come inside the wheels. The sloping frame member 184 is formed integrally with a cross connection 194, and the same applies to the corresponding sloping frame member on the opposite side of the carriage, so that each of the two pivoted frame members are generally U-shaped. Parts 186, 188 spring outward.

The operation will be understood from examination of the drawing, for when the rocker is in the raised position shown in FIGURES 18, 19 and 20, the parts 186 act as detent members which are received in the channel of the frame 184. This holds the rocker in its raised position. However, by intentionally pushing the rocker downwardly, the detent portion may be sprung out of the channel and the rocker may be turned somewhat beyond vertical to a position in which the part 188 rests against the cross bar 194 as shown in FIGURE 21. With this arrangement, the rocker position is maintained gravitationally. However, it will be understood that a recess may be formed in the frame to receive the part 186 with a detent action (much as at 84 in FIG. 2), if it be desired to provide a detent action for both positions of the rocker.

It will be understood that the rocker 190 is symmetrical, and that a stub axle is formed at each end, these being integral with and constituting extensions of the rocker. Also, a similar rocker construction is provided for the other axle at the other end of the carriage, except for appropriate reversal or change in configuration to allow for the fact that both rockers are to be turned outward when not used as rockers, so that they will serve as bumpers. It will also be seen from examination of FIGURE 18 of the drawing that there will be no interference with folding or collapsing of the carriage, as shown in FIG. 13.

It is believed that the construction and method of use of my improved baby carriage, as well as the advantages thereof, will be apparent from the foregoing detailed description. The carriage is readily converted to a cradle. The rockers when not in use are turned up out of the way and then serve a useful purpose as bumpers. The mechanism for the rockers is localized at the axles in such a manner as not to interfere with compact folding of the carriage. The rockers serve an additional purpose in acting as a brake to prevent rolling of the carriage, and for this purpose it is necessary to turn down only one of the two rockers, so that the carriage then rests on a rocker at one end and on its two wheels at the other end.

It will be understood that while we have shown and described the invention in several preferred forms, changes may be made in the structures shown without departing from the scope of the invention, as sought to be defined in the following claims. In the claims the term "baby carriage" is intended to include a carriage of smaller dimension used for dolls, and also is intended to include variants such as "strollers" to which the present improvements are readily applicable.

We claim:

1. A baby carriage comprising a body, wheels, a rocker extending transversely of the carriage at one end, a rocker extending transversely of the carriage at the other end, means pivotally mounting said rockers for movement between a raised position and a lowered position, means to fix the rockers in either the raised position or the lowered position, the rockers in their raised position projecting approximately horizontally beyond the ends of the body and acting as bumpers for said carriage, the rockers in their lowered position coming beneath the wheels for a cradle action, and short stub axles for carrying the wheels, said axles being formed integrally with an constituting extensions of the rockers.

2. A baby carriage of the folding type comprising pivotally related frame members, a collapsible body carried thereby, two forward and two rearward wheels carried thereby, a rocker extending transversely of the carriage and pivotally mounted at the forward two of said wheels, a rocker extending transversely of the carriage and pivotally mounted at the rear two of said wheels, means pivotally mounting said rockers for movement between a raised and a lowered position, means to fix the rockers in either the raised position or the lowered position, the rockers in their lowered position coming beneath the wheels for a cradle action, the pivotal mounting means for said rockers being so localized at said wheels as not to interfere with the desired folding action of the carriage, and short stub axles for carrying the wheels, said axles being formed integrally with and constituting extensions of the rockers.

3. A baby carriage of the folding type comprising pivotally related frame members, a collapsible body carried thereby, two forward and two rear wheels carried thereby, a rocker extending transversely of the carriage and pivotally mounted at the forward two of said wheels, a rocker extending transversely of the carriage and pivotally mounted at the rear two of said wheels, means pivotally mounting said rockers for movement between a raised position and a lowered position, means to fix the rockers in either the raised position or the lowered position, the rockers in their raised position projecting approximately horizontally beyond the ends of the body and acting as bumpers for said carriage, and the rockers in their lowered position coming beneath the wheels for a cradle action, the pivotal mounting means for said rockers being so localized at said wheels as not to interfere with the desired folding action of the carriage, and short stub axles for carrying the wheels, said axles being formed integrally with and constituting extensions of the rockers.

References Cited in the file of this patent

UNITED STATES PATENTS

| 333,189 | Abel | Dec. 29, 1885 |
| 1,168,294 | Etter | Jan. 18, 1916 |
| 1,387,089 | Willis | Aug. 9, 1921 |
| 2,293,560 | Price | Aug. 18, 1942 |
| 2,341,117 | Reinholz | Feb. 8, 1944 |
| 2,452,838 | Come | Nov. 2, 1948 |
| 2,535,615 | Ausdall | Dec. 26, 1950 |
| 2,548,601 | Gottfried | Apr. 10, 1951 |
| 2,716,439 | Feist | Aug. 30, 1955 |
| 3,010,731 | Kenney | Nov. 28, 1961 |

FOREIGN PATENTS

| 777,134 | France | Nov. 17, 1934 |